(Model.)
D. S. KELTON.
SELF FEEDER DUST PREVENTING COAL RECEIVER.
No. 362,283. Patented May 3, 1887.
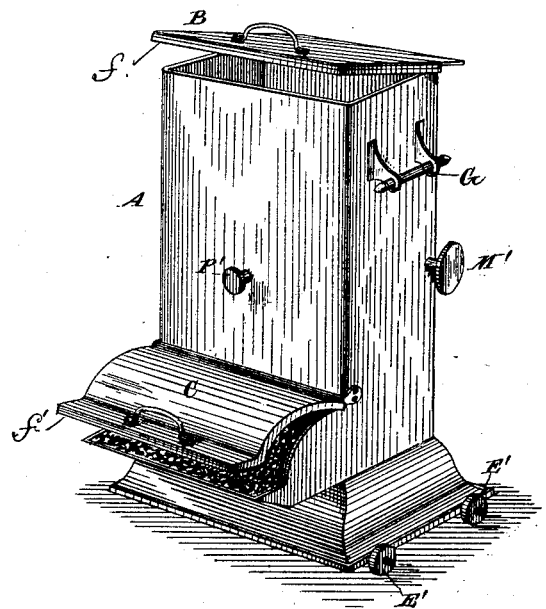
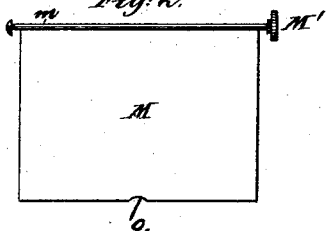
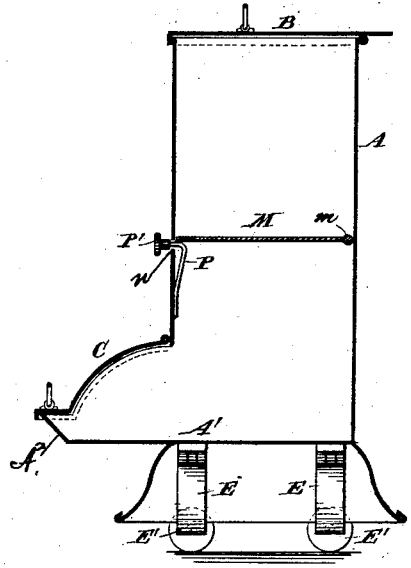
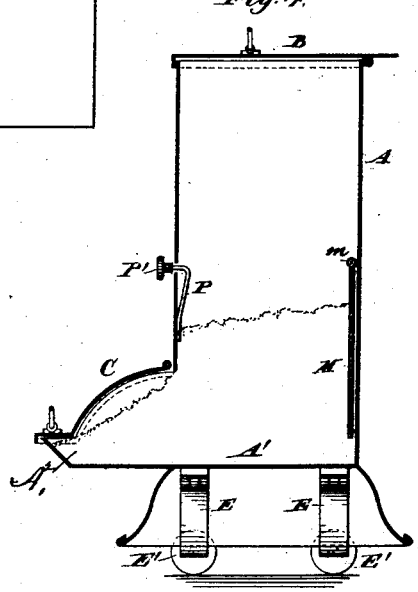
Witnesses:
Charles R. Searle,
M. F. Boyle.
Inventor:
Daniel S. Kelton
by his attorney
Thomas Drew Stetson

UNITED STATES PATENT OFFICE.

DANIEL SLATER KELTON, OF BROOKLYN, NEW YORK.

SELF-FEEDER DUST-PREVENTING COAL-RECEIVER.

SPECIFICATION forming part of Letters Patent No. 362,283, dated May 3, 1887.

Application filed July 12, 1886. Serial No. 207,825. (Model.)

*To all whom it may concern:*

Be it known that I, DANIEL SLATER KELTON, of the city of Brooklyn, county of Kings, and State of New York, have invented a Self-Feeding Dust-Preventing Coal-Receiver for Family and Office Use, of which the following is a specification.

This invention has relation to improvements in coal-receivers suitable for stores, dwellings, office-rooms, and other places; and it consists in the novel construction and arrangement of parts, as will be hereinafter described, and particularly pointed out in the claim.

In the accompanying drawings, Figure 1 is a perspective view of the device. Fig. 2 is a view of the internal platform detached. Fig. 3 is a vertical section of the improvement. Fig. 4 is a corresponding section showing the device with the central platform open, with the coal on the bottom of the casing.

Referring to the drawings, the letter A represents a casing made, preferably, in rectangular form, and which may be varied in size according to the quantity of coal that it is desired it should contain. Said casing may be made of wood or metal, either plain, polished, or decorated, and it is provided with a top cover, B, hinged to the casing, as shown, and provided with a projecting lip or flange, $f$, to fit tightly over the mouth of the casing. The bottom of the casing is provided with an extension, $A^2$, constructed as shown, to permit the contents of the bottom A' to be readily accessible. The extension is covered by a close-fitting cover, C, hinged to the front ends of the casing and provided with a lip or flange, $f'$. The casing is mounted upon folding legs E, having wheels or rollers E', connected to the base by hinges, as shown. At the center of the casing is a platform, M, connected to a shaft, $m$, said platform being held, when in a horizontal position, by a spring-catch, P, attached to the inner surface of the casing, at the front portion thereof. The opposite end of the spring-catch passes through an opening, $n$, in the front of the casing, and has connected to it an operating-knob, P'. The function of this platform M is to temporarily hold the coal thrown into the receiver A', so as to prevent the noise which would be caused if the coal were allowed to fall directly to the bottom of the casing. The casing is further provided with handles G, which permit of its being moved around at will. The casing can be filled in coal-cellars, put on an elevator, and carried to the rooms for use.

The swinging platform M is provided with a notch, $o$, and the shaft $m$ thereof with an operating-handle, M'. After the cover at the top of the casing is closed and it is desired to dump or lower the coal from the platform M to the bottom of the casing A', the spring-catch P is pulled outward by its knob P', the platform is released, and the coal descends to the receptacle A'. The notch $o$ of said platform in its downward course straddles the spring P, whereby said platform is kept in position and prevented from binding or having lateral movement against the walls of the casing.

Having described my invention, what I claim is—

In a coal-receiver, the combination, with the casing A, provided with an opening, $n$, the spring-catch P, passing through the opening and having an operating-knob, P', of the platform M, pivoted to the casing by the rod $m$, having knob M', said platform also provided with notch $o$ to engage the spring P, whereby said platform is kept in proper position to prevent binding or lateral movement against the walls of the said casing in its downward or swinging movement, as shown and described.

DANIEL SLATER KELTON.

Witnesses:
JAMES H. WHITEHORN,
JOHN F. DOD.